United States Patent [19]
Nolf

[11] 4,366,011
[45] Dec. 28, 1982

[54] HEAT-RECOVERABLE REINFORCED ENCLOSURE

[75] Inventor: Jean-Marie E. Nolf, Beauvechain, Belgium

[73] Assignee: N.V. Raychem S.A., Kessel-lo, Belgium

[21] Appl. No.: 211,674

[22] Filed: Dec. 1, 1980

Related U.S. Application Data

[63] Continuation of Ser. No. 12,014, Feb. 14, 1979, abandoned.

[30] Foreign Application Priority Data

Feb. 21, 1978 [GB] United Kingdom ............... 6907/78

[51] Int. Cl.³ .................. B29C 27/00; H02G 13/06; F16L 55/16; H01R 3/00
[52] U.S. Cl. ..................................... 156/86; 138/99; 138/168; 156/49; 174/92; 174/DIG. 8; 285/381; 285/419; 428/36; 403/273; 403/344
[58] Field of Search ............... 174/91, 92, 93, DIG. 8; 403/311, 313, 273, 344; 285/373, 381, 419; 220/93; 150/52 R; 138/167, 168, 99; 156/85, 86, 49; 428/36

[56] References Cited

U.S. PATENT DOCUMENTS

| | | | |
|---|---|---|---|
| 1,827,722 | 10/1931 | Hayman | 138/167 |
| 2,038,389 | 4/1936 | Siebenlist | 138/167 |
| 3,154,330 | 10/1964 | Clark et al. | 285/419 |
| 3,455,336 | 7/1969 | Ellis | 174/DIG. 8 |
| 3,916,086 | 10/1975 | Gillemot et al. | 174/92 |
| 4,016,356 | 4/1977 | McLoughlin | 174/DIG. 8 |
| 4,142,592 | 3/1979 | Brusselmans | 174/DIG. 8 |

FOREIGN PATENT DOCUMENTS

| | | |
|---|---|---|
| 1098673 | 1/1968 | United Kingdom . |
| 1428134 | 3/1976 | United Kingdom . |
| 1431167 | 4/1976 | United Kingdom . |
| 1497051 | 2/1978 | United Kingdom . |

*Primary Examiner*—William R. Dixon, Jr.
*Attorney, Agent, or Firm*—Lyon & Lyon

[57] ABSTRACT

A bracing surround which comprises a heat-recoverable especially a heat-shrinkable, sleeve provided with a reinforcing member which does not prevent recovery of the sleeve but which is capable, when in the configuration held when the sleeve is recovered, of resisting forces tending to return it to the configuration held when the sleeve is in its recoverable configuration. The surround is used to enclose substrates, e.g., pressurized conduit junctions, that are subject to expansion in use.

24 Claims, 3 Drawing Figures

HEAT-RECOVERABLE REINFORCED ENCLOSURE

This is a continuation of application Ser. No. 012,014, filed Feb. 14, 1979 now abandoned.

This invention relates to a heat-recoverable article, especially an article suitable for forming the outer covering to a conduit junction, and to a method of enclosing, e.g., the conduit junction, using the article.

It has previously been proposed, for example in British Patent Specification No. 1,431,167 published Apr. 7th, 1976, in the name of N. V. Raychem S.A., to provide an assembly for protecting and insulating a junction between conduits, which comprises a relatively rigid longitudinally split tube of internal diameter such that the tube will accommodate the junction, relatively rigid support means for the split tube, and a heat-shrinkable sleeve of length greater than the length of the tube with the support means, at least part of the inner walls of the heat-shrinkable sleeve having applied thereto sealing material such that, on shrinking the sleeve down over the junction, the end regions of the sleeve which shrink down over the conduits are sealed thereto.

The assembly is employed by positioning over a junction between conduits the split tube and the support means, and shrinking the heat-shrinkable sleeve over the junction surrounded by the split tube and support means, the length of the sleeve being such that its ends recover over the conduits, the sealing material on its internal surface sealing the tube to the conduits.

It has also been proposed, in U.S. Ser. No. 955,537 in the name of Jean-Marie Etienne Nolf, filed October 30, 1978, to provide a heat-recoverable article which comprises a heat-shrinkable tubular sleeve having an inner lining of a continuous thin metal foil and provided with central reinforcing means comprising one or more longitudinally compressible coils.

Where two or more conduits enter a junction from the same side, the heat-shrinkable sleeve may be clipped together between them to provide the necessary sealing, as described, for example, in U.S. Patent Application entitled "Branch-Off Method", filed on Dec. 27th, 1978, in the name of Jean-Marie Etienne Nolf.

While the above described arrangements have met with approval for certain uses, they have not proved entirely satisfactory when the conduits covered are maintained at a high superatmospheric pressure since, although they are substantially gas-tight, they have a tendency to bulge under the pressure. An increase in the wall thickness of the shrinkable sleeve to counteract this pressure makes the process of shrinking more difficult and the success of sealing less certain.

The present invention provides a method of enclosing an article, especially an assembly protecting a conduit junction, which comprises positioning over a region of the article subject to expansion or deformation under pressure a bracing surround which comprises a sleeve at least a part of which is heat-recoverable and, optionally, means for spacing the ends of the sleeve from the article, and recovering the sleeve, whereby the expansion or deformation of the article is substantially reduced.

The invention also provides a bracing surround suitable for use in the method. Advantageously the surround comprises a heat-recoverable sleeve, preferably a wrap-around sleeve, the sleeve being provided with a reinforcing member, e.g., a liner, which advantageously extends the entire length of the sleeve, and which does not prevent recovery of the sleeve but which is capable when in the configuration held when the sleeve is recovered, of resisting forces tending to return it to the configuration held when the sleeve is in its recoverable configuration. When the sleeve is a wrap-around sleeve the member advantageously extends around enough of the circumference of the sleeve to provide some overlap of the opposite edges of the member, although it need not, and preferably does not, extend wholly to the edge of the sleeve that is to provide the outer layer of the overlap of the sleeve.

The present invention more especially provides a bracing surround comprising a heat-shrinkable sleeve provided with a reinforcing member extending for substantially the entire length of the sleeve, which member has means for preventing the expansion of the member which means do not prevent shrinkage of the sleeve. The member is advantageously positioned within the sleeve, i.e, it has a smaller diameter than the internal diameter of the sleeve.

It may thus be seen that the reinforcing member used in the surround of the present invention provides at all times and under all conditions resistance to radial expansion while providing little or no resistance to shrinkage of the sleeve under shrinkage conditions.

Advantageously, the surround is provided with means that prevent expansion of its cross-section after installation; the means is preferably on, or is part of, the member, referred to hereinafter as the liner, and may comprise a series of ratchets on the portions of the liner that will overlap in the installed configuration. By the provision of the means for preventing expansion without preventing shrinking the bracing surround may be shrunk without difficulty about the article. If, after installation, the article attempts to expand under pressure, the ratchets, or other locking means, will resist the expansion.

The means for spacing the ends of the sleeve from the article may be integral with, attached to, or separate from, the sleeve. They are advantageously attached to the sleeve, in the form of a segmented ring. They are provided to allow for the possibility that the elongate article to be braced by the surround is, as is normally the case with a cable splice, of smaller cross-section at its ends than in its central region. In order to be able to provide a reinforcement of adequate strength, it is desirable that the recovery of the sleeve be uniform throughout its length and the provision of the spacing means at the ends of the sleeve makes this possible while allowing the whole region of the article likely to expand under pressure to be braced. The spacing means must itself or in combination with the other components of the surround be capable of bracing the part of the article that it will contact.

When the article to be covered has protuberances, the inside surface of the liner may be complementarily shaped. For example, a cable junction may be protected by an outer layer comprising a heat-shrunk wrap-around closure sleeve as described and claimed in British Patent Specification No. 1,155,470, in the name of Raychem Corporation, published June 18th, 1969. The edges of a sleeve constructed as described in that specification are formed into rails which are held together by an elongate channel which protrudes slightly from the surface of the remainder of the closure sleeve. Accordingly, where the bracing surround is to be used with such a closure sleeve, the interior of the reinforcing liner of the bracing surround may be provided with a longitudinal groove to accommodate the rails and channel. The groove may be provided in a thickened portion of the liner itself, or it may be formed in an elongate insert that may be attached to, or separate from, the liner. The shape of the insert or thickened portion is desirably such as to smooth out, or absorb, the profile of the protuberance which is to be accommodated.

The reinforcing liner is advantageously a resilient sleeve, advantageously of a resilient metal, e.g., beryllium-copper, phosphor bronze, or steel. Alternatively, it may be of a resilient, creep-resistant moulded plastics material. Advantageously, the expansion preventing means comprise inwardly extending teeth on the region of the edge of the liner that is to form the outer layer of overlap, and outwardly extending teeth on the region of the edge of the liner that is to form the inner layer of the overlap, both sets of teeth being inclined so that their free ends are directed away from the longitudinal edge of the liner to which they are closer. Advantageously, the teeth are stamped out of the liner, and are formed in a plurality of radial rows, the rows being spaced longitudinally at intervals. If the liner is of a plastics material, the teeth are advantageously moulded into, rather than stamped from, the sheet. In either case, the teeth are advantageously of a greater breadth at their roots than at their free ends, to allow for easier engagement if the opposite ends of the liner are not precisely aligned.

The heat-recoverable sleeve may be of any material capable of being rendered heat-recoverable, many of which are known to those skilled in the art, e.g. a cross-linked polyolefine-containing composition, e.g. a filled, cross-linked polyethylene composition. The sleeve is advantageously provided with the channel and rail closure system described in the above-mentioned British Patent Specification No. 1,155,470.

As indicated above, the liner advantageously does not extend to the edge of the sleeve that will form the outer layer at the overlap, and also, advantageously, the liner extends beyond the edge of the sleeve that will form the inner layer. During installation, the liner reduces its circumference by increasing its overlap, so that the edge of the liner at the outer layer of the overlap will approach the edge of the sleeve during shrinkage. For this reason, the rail near the edge of the sleeve that forms the inner layer is desirably made taller than that at the edge that will form the outer layer, so that, initially, there is an annular space between the overlaps which is eventually filled by the advancing edge of the liner.

Two forms of bracing surround constructed in accordance with the invention, and one method of bracing according to the invention, will now be described, by way of example only, with reference to the accompanying drawings, in which FIG. 1 illustrates a first form of surround in the heat-recoverable configuration;

Figure 1:
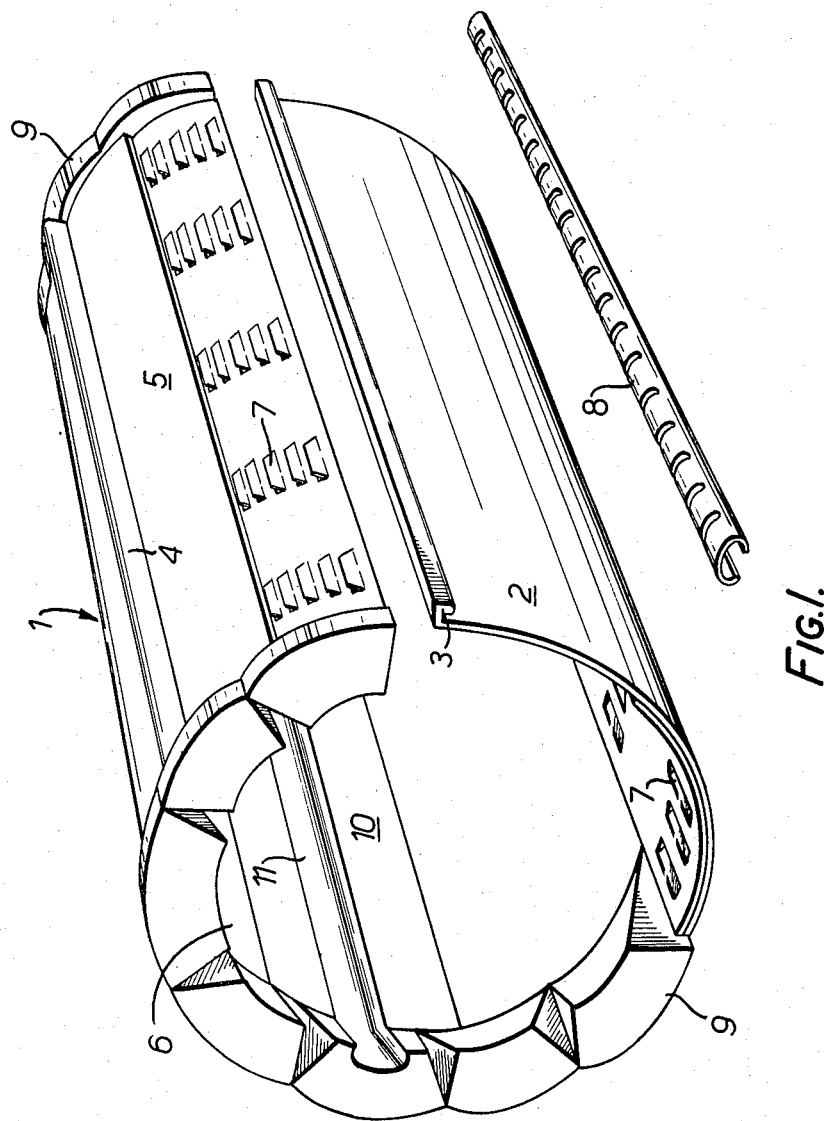

Referring now to the drawings, there is shown a surround indicated generally by the reference numeral 1. The surround 1 comprises a heat-shrinkable wrap-around sleeve 2 having a rail 3 at one longitudinal edge, and a rail 4 spaced from the other longitudinal edge by a flap 5. The height of the rail 4 is greater than that of the rail 3. A flexible steel liner 6 is positioned inside the sleeve 2 so that it terminates short of the edge carrying the rail 3 but extends beyond the flap 5. Each edge region of the liner is provided with teeth or ratches 7. In use, the rails 3 and 4 are placed in abutment, and held during recovery by the channel 8 shown alongside the surround 1 in FIG. 1. Positioned around each of the curved edges of the surround for a portion of their circumference is a segmented bracing ring 9. Positioned within the liner is a longitudinally extending member 10 having a groove 11, which is continued into one segment of the ring 9 at each end. The inside surface of the sleeve 1 may be coated with a hot-melt adhesive (not shown).

Figure 2:
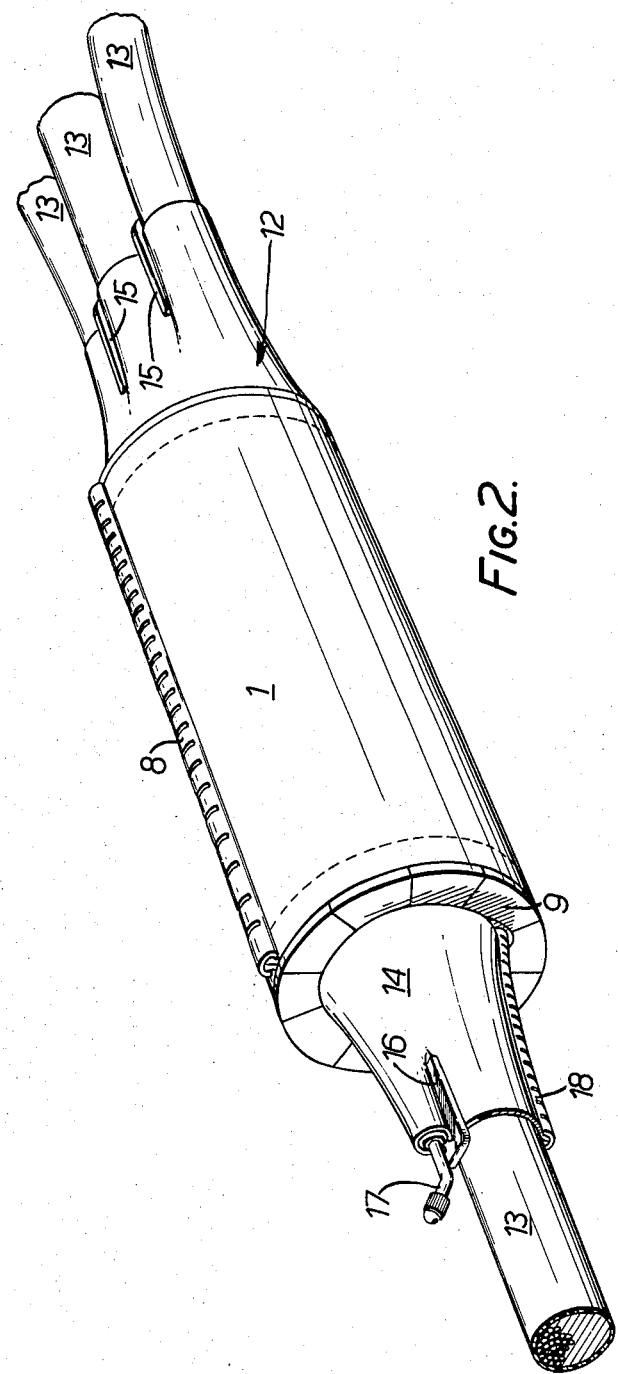
FIG. 2 illustrates the surround recovered about a cable junction.

Referring now more especially to FIG. 2, the surround 1 is shown recovered about a cable junction indicated generally by the reference numeral 12. The junction 12, between cables 13, has been covered by a wrap-around sleeve 14 as described in British Patent Specification No. 1,155,470 having an aluminum foil layer to reduce its water and/or gas permeability, the sleeve having been recovered over a split tube and support rings (not shown) as described in British Patent Specification No. 1,431,167. Between the cables 13 entering at one end are clips 15, and at the other end is a further clip 16 which provides a seal between the cable 13 and a valve 17, through which the interior of the junction 12 may be pressurized. The longitudinal edges of the sleeve 14 are retained in abutment by the channel 18.

Figure 3:
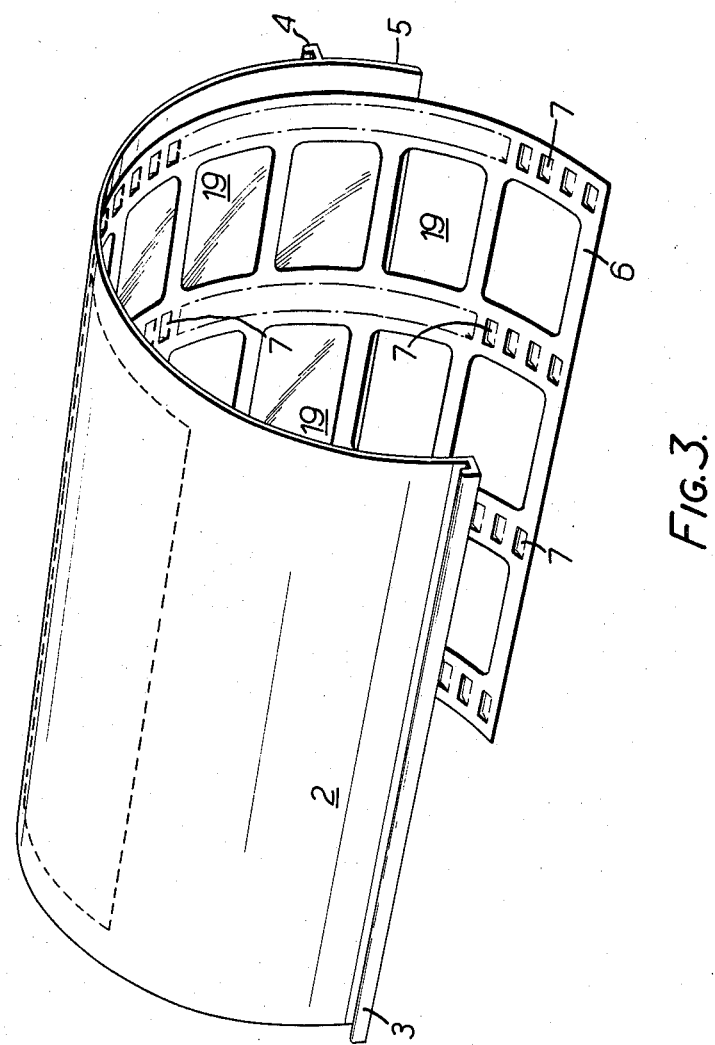
FIG. 3 illustrates a second form of bracing surround.

Referring now more especially to FIG. 3, the sleeve 2 is similar to that shown in FIG. 1, having a flap 5 and rails 2 and 3. Along a line intermediate between and parallel to the rails its interior surface is tacked or spot-bonded to the outer surface of a flexible liner 6. The liner has rows of teeth or ratches 7, in between which are located rows of apertures 19, the flexibility of the liner being improved over that of FIG. 1 by the apertures 19.

Installation of the surround 1 is carried out by positioning it over the junction 12 with the groove 11 in alignment with the channel 18. The rails 3 and 4 of the sleeve 2 are contacted and the channel 8 installed. The surround is then heated, e.g., by means of a gas torch, to cause recovery of the sleeve 2 and melting of the hot melt adhesive. As the diameter of the sleeve is reduced, the overlap between the opposed edge of the liner 6 increases, the ratches 7 offering no resistance to this, the outer edge of the liner 6 travelling over the outer surface of the underlying flap 5, the liner 6 and the rings 9 being forced into contact with the sleeve 14. If, in use, the sleeve 14 tends to bulge under the pressure of gas (introduced, for example, through the valve 17), its expansion is resisted by the metal liner 6 which cannot expand because the ratchets 7 and the strength of the recovered sleeve 2 prevent it.

Accordingly, it will be seen that the invention provides effective bracing of an expansible member, the bracing surround being simple to install.

If desired or required, the bracing surround of the invention may incorporate or be provided with a gas and/or water vapour impermeable liner, preferably positioned within the reinforcing liner.

The invention also provides a closure article having a gas and/or vapour barrier within the expansible member or in which the expansible member forms the barrier, surrounded by the bracing surround of the invention, and a conduit junction protected thereby.

What I claim is:

1. A brace which comprises a heat-recoverable sleeve provided with a reinforcing member positioned in the direction of recovery of the sleeve which allows recovery of the sleeve, the reinforcing member including means capable, when the member is in the configuration held when the sleeve is recovered, of resisting forces tending to return the member to the configuration held when the sleeve is in its recoverable configuration.

2. A brace as claimed in claim 1, wherein the reinforcing member is a liner.

3. A brace as claimed in claim 1, wherein the reinforcing member extends for the entire length of the sleeve.

4. A brace as claimed in claim 1, wherein the sleeve is a wrap-around sleeve.

5. A brace as claimed in claim 4, wherein the member extends sufficiently around the circumference of the sleeve to provide overlap of the opposite edges of the member, without extending wholly to the edge of the sleeve that provides the outer layer of the overlap of the sleeve.

6. A brace comprising a heat-shrinkable sleeve provided with a reinforcing member extending for substantially the entire length of the sleeve, which member has means for preventing the expansion of the member which means do not prevent shrinkage of the sleeve.

7. A brace as claimed in claim 6, wherein the member is positioned within the sleeve.

8. A brace as claimed in claim 6, wherein the brace is provided with means that prevent expansion of its cross-section after installation.

9. A brace as claimed in claim 8, wherein the means is on the member.

10. A brace as claimed in claim 8, wherein the means is an integral part of the member.

11. A brace as claimed in claim 6, which comprises spacer means for spacing the ends of the sleeve from an article to be covered by the brace.

12. A brace as claimed in claim 11, wherein the spacer means are attached to the sleeve.

13. A brace as claimed in claim 12, wherein the spacer means at each end are in the form of a segmented ring.

14. A brace as claimed in claim 6, wherein the interior of the reinforcing member is provided with a longitudinal groove.

15. A brace as claimed in claim 14, wherein the groove is provided in a thickened portion of the member.

16. A brace as claimed in claim 6, wherein the reinforcing member is a resilient sleeve.

17. A brace as claimed in claim 6, wherein the reinforcing member is a resilient metal sleeve.

18. A brace as claimed in claim 17, wherein the metal is selected from the group consisting of beryllium-copper, phosphor bronze, and steel.

19. A brace as claimed in claim 16, wherein the sleeve is of a resilient, creep-resistant moulded plastics material.

20. A brace as claimed in claim 6, wherein the member has edge portions that, in use, overlap and the expansion preventing means comprises ratchets on the overlapping portions.

21. A brace as claimed in claim 20, wherein the expansion preventing means comprise inwardly extending teeth on the region of the edge of the member that is to form the outer layer of overlap, and outwardly extending teeth on the region of the edge of the member that is to form the inner layer of the overlap, both sets of teeth being inclined so that their free ends are directed away from the longitudinal edge of the member to which they are closer.

22. A brace as claimed in claim 21, wherein the teeth are formed in a plurality of radial rows, the rows being spaced longitudinally at intervals.

23. A brace as claimed in claim 21, wherein the teeth are of a greater breadth at their roots than at their free ends.

24. A method of enclosing an article which comprises positioning over a region of the article subject to expansion or deformation under pressure a brace which comprises a heat-recoverable sleeve and a reinforcing member which allows recovery of the sleeve, the reinforcing member being positioned in the direction of recovery of the sleeve and which, when in the configuration held when the sleeve is recovered, resists forces tending to return the member to the configuration held when the sleeve is in its recoverable configuration, and recovering the sleeve, whereby the expansion or deformation of the article is substantially reduced.

* * * * *